US007942530B2

(12) United States Patent
Majumder et al.

(10) Patent No.: US 7,942,530 B2
(45) Date of Patent: May 17, 2011

(54) APPARATUS AND METHOD FOR SELF-CALIBRATING MULTI-PROJECTOR DISPLAYS VIA PLUG AND PLAY PROJECTORS

(75) Inventors: Aditi Majumder, Irvine, CA (US); Pinaki Sinha, Irvine, CA (US); Ezekiel S. Bhasker, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 1045 days.

(21) Appl. No.: 11/704,412

(22) Filed: Feb. 8, 2007

(65) Prior Publication Data
US 2008/0100805 A1    May 1, 2008

Related U.S. Application Data

(60) Provisional application No. 60/855,603, filed on Oct. 31, 2006.

(51) Int. Cl.
*G03B 21/26* (2006.01)
*G03B 21/14* (2006.01)
*G06K 9/40* (2006.01)
*H04N 5/66* (2006.01)
*H04N 9/12* (2006.01)
*G09G 5/00* (2006.01)

(52) U.S. Cl. .............. 353/30; 353/94; 353/69; 382/286; 382/254; 348/383; 345/1.3; 345/214

(58) Field of Classification Search .............. 353/30–31, 353/94, 69; 382/286, 254; 348/383; 345/204, 345/1.3, 214
See application file for complete search history.

(56) References Cited

U.S. PATENT DOCUMENTS

| | | | | |
|---|---|---|---|---|
| 6,219,099 | B1* | 4/2001 | Johnson et al. | 348/383 |
| 6,733,138 | B2* | 5/2004 | Raskar | 353/94 |
| 7,306,341 | B2* | 12/2007 | Chang | 353/94 |
| 2008/0002160 | A1* | 1/2008 | Chang et al. | 353/94 |

* cited by examiner

*Primary Examiner* — Georgia Y Epps
*Assistant Examiner* — Magda Cruz
(74) *Attorney, Agent, or Firm* — Shimoraji & Associates, P.C.; Daniel L. Dawes

(57) ABSTRACT

An asynchronous, distributed, and calibrated apparatus provides a composite display from a plurality of plug-and-play projectors. The apparatus comprises a plurality of self-sufficient modules. Each module comprises at least one plug-and-play projector of the plurality of plug-and-play projectors. A camera is coupled to the projector. A software or firmware controlled, computation and communication circuit is coupled to the projector and executes a single-program-multiple-data (SPMD) calibration algorithm that simultaneously runs on each self-sufficient module to generate a scalable and reconfigurable composite display without any need for user input or a central server.

17 Claims, 18 Drawing Sheets

APPARATUS AND METHOD FOR SELF-CALIBRATING MULTI-PROJECTOR DISPLAYS VIA PLUG AND PLAY PROJECTORS

RELATED APPLICATIONS

The present application is related to U.S. Provisional Patent Application Ser. No. 60/855,603, filed on Oct. 31, 2006, which is incorporated herein by reference and to which priority is claimed pursuant to 35 USC 119.

BACKGROUND OF THE INVENTION

1. Field of the Invention

The invention relates to the field of methods and systems for asynchronous distributed control of multiple projector displays.

2. Description of the Prior Art

Plug-and-play projectors are known and are described by Ramesh Raskar from Mitsubishi Electric Research Laboratory (MERL), Boston in U.S. Patent Publications 2004/0184010 and 2004/0184011, which are incorporated herein by reference. Centralized techniques have been used until now when automatically calibrating (both geometrically and photometrically) large high-resolution displays created by tiling multiple projectors in a two dimensional array. A centralized server managed all the projectors and also the camera(s) used to calibrate the display.

Large high-resolution displays created by tiling multiple display units in a two dimensional array are used regularly for many applications like visualization, training, simulation and collaboration. Projectors are usually preferred over LCD panels in such applications since the bezels bordering the LCD panels make them incapable of generating one seamless image. However, projection based tiled displays suffer from two other problems as illustrated in FIG. 3c, namely the image is not geometrically matched across the projector boundaries; and/or the color and brightness of the image is non-uniform due to overlap in the projected area of adjacent projectors on the screen which appears doubly bright, and also due to varying color/brightness within and across projectors. In the early days of tiled displays, the prohibitive cost of projectors and driving engines limited the number of projectors to a handful allowing manual geometric alignment and color balancing of the display. With the advent of commodity projectors and PC clusters to drive them, displays with a large number of projectors are very affordable today.

But, manual calibration methods are both infeasible and unscalable for such large displays. So, several camera-based calibration techniques have been devised to calibrate these displays automatically, repeatably and inexpensively. All existing camera-based calibration techniques have a centralized architecture where one central machine or process bears the sole responsibility of achieving the geometric and color calibration by capturing specific projected patterns using a camera, analyzing them to generate the correction parameters, applying correction to different parts of the image to compensate for each projector's unique geometric and color artifacts, and finally shipping these images to the projectors to create a seamless display as illustrated in FIG. 1a.

The advantage of centralized calibration is in having a common global reference frame to address the pixel geometry and color. Thus, managing multiple display units to create a global seamless image is relatively easy. However, centralized calibration is not scalable (increasing the number of projectors making up the display) or reconfigurable (changing the shape, aspect ratio and resolution of the display). Further, it is intolerant to faults, especially in the central server. In addition, deploying a centralized multi-projector display demands an educated user to set up the computers, projectors and camera appropriately, input the right parameters to the central server and maintain the whole set-up periodically.

Projectors today are affordable. Thus, building mammoth displays with billions of pixels by tiling hundreds of projectors is not unthinkable. At the other end of the spectrum, smaller, mobile and flexible "pack-and-go" displays are very much desired for applications like map and troop-movement visualization on the battlefield. They can even be used in public venues like schools and museums. A centralized calibration architecture inhibits the realization of the full potential of using projectors in these kinds of scenarios.

BRIEF SUMMARY OF THE INVENTION

The illustrated embodiment is an asynchronous distributed calibration methodology via a display unit defined for the purposes of this specification as a plug-and-play projector module (hereinafter PPP). The PPP is comprised of a projector, camera, computation and communication unit, thus creating a self-sufficient module that enables an asynchronous distributed architecture for multi-projector displays. We present a single-program-multiple-data (SPMD) calibration algorithm or program that runs on each PPP and achieves a truly scalable and reconfigurable display without any input from the user. The program instruments novel capabilities like adding and/or removing PPPs from the display dynamically, detecting faults, and reshaping the display to a reasonable rectangular shape to react to the addition, removal, and/or faults. This is the first attempt to realize a completely asynchronous and distributed calibration architecture and methodology for multi-projector displays.

The illustrated embodiment of the invention is directed to the development of a smart display unit called a plug-and-play projector (PPP). Multiple ones of these projectors can be used like Lego® pieces to create a large high-resolution displays.

The illustrated embodiment of the invention is also directed the development of distributed calibration techniques that can find the configuration of the display (number of PPPs and the total number of rows and columns in the array), position of a PPP in it, and calibrate it geometrically and photometrically to achieve a seamless large display.

The illustrated embodiment has the advantage of there being no user input, i.e. the user does not need to input any information about the display including the total number of units making up the display.

There is no centralized server, i.e. each display unit manages its pixels by itself, as opposed to a central server doing all the management. Hence extra units can be easily added to the display (scalable) and it can also be reshaped to a different aspect ratio or size (reconfigurable).

The system is fault tolerant. In case of failure of display units, appropriate actions can be taken to run the display at a limited capability.

Therefore, in summary, the illustrated embodiment of the invention is an asynchronous, distributed, and calibrated apparatus for providing a composite display from a plurality of plug-and-play projectors. The apparatus comprises a plurality of self-sufficient modules. Each module comprises at least one plug-and-play projector of the plurality of plug-and-play projectors. A camera is coupled to the projector. A software or firmware controlled, computation and communication circuit is coupled to the projector and executes a single-program-multiple-data (SPMD) calibration algorithm that simultaneously runs on each self-sufficient module to generate a scalable and reconfigurable composite display without any need for user input.

Each self-sufficient module comprises a software or firmware controlled circuit for dynamically adding and/or removing a projector from the composite display and comprises a software or firmware controlled circuit for detecting faults or for performing an action to run the composite display at a limited capability in case of failure of another one of the modules. Each self-sufficient module comprises a circuit for reshaping the composite display to a usable rectangular shape in response to addition or removal of a projector, and/or existence of a fault in projector performance.

Each projector generates an image, which is part of the composite display that has a configuration characterized by the number of projectors used to generate the composite display from the images and a number rows and columns in an array of the images. Each self-sufficient module comprises a circuit for determining the configuration of the composite display, for determining a position in the composite display of the image, for geometrically and photometrically matching adjacent images in the composite display to provide a seamless composite display of the images, for managing its image within the composite display by itself without any central server, so that the composite display is self-scalable and self-reconfigurable to a different aspect ratio or size without the need for user input.

The illustrated embodiment of the invention is also characterized as a an apparatus and method for asynchronous distributed control of a plurality of plug-and-play projector modules. Each module generates an image in a composite display comprising the steps of: employing separate camera-based feedback from the display to each of the plug-and-play projector module; detecting the number of neighbors of a plug-and-play projector modules in the display; finding the position in the display of the image corresponding to the plug-and-play projector modules; geometrically calibrating and photometric blending adjacent projected images in the display from the plug-and-play projector modules using asynchronous distributed control; and dynamically adding/removing images from the plug-and-play projector modules from the display. As a result, a self-calibrating tiled display is obtained without the need for user control of set-up or maintenance.

The method further comprises the step of tolerating faults or failures of the plug-and-play projector modules using asynchronous distributed control to automatically reconfigure, recalibrate and function at a limited capability.

Still further the illustrated embodiment of the invention is a method of providing a tiled display without the use of a central server comprising the steps of: asynchronously generating a plurality of tiled image in the display using a corresponding plurality of self-sufficient projector modules; and asynchronously capturing selected portions of the display corresponding to the plurality of self-sufficient projector modules using a corresponding camera included in each projector module to self-calibrate each corresponding tiled image in the display, to determine the corresponding position of each tiled image in the display, to determine the corresponding configuration of the tiled image of the display, and/or to determine a corresponding neighborhood of images for each self-sufficient projector. The method further comprises the step of dynamically adding or removing one or more projector modules from the plurality of projector modules to scale, reshape, and/or reconfigure the display. Where in the case of a fault in one or more of the projector modules, the method further comprises the step of automatically self-reconfiguring the display to a predetermined shape.

The step of asynchronously capturing selected portions of the display comprises performing a Capture process in each self-sufficient projector module. The step of asynchronously generating a tiled image in the display comprises performing a Compute process in each self-sufficient projector module. The method comprises providing a shared queue of images in each self-sufficient projector module and a shared Boolean program, CALIB, in each self-sufficient projector module used to denote the state of the corresponding self-sufficient projector module, where the Capture process captures images from the corresponding camera and en-queues them in the corresponding queue, and where the Compute process de-queues images from the corresponding queue, analyzes them, computes configuration and calibration parameters, and sends a corresponding image to be displayed by each self-sufficient projector module.

The Compute process comprises in each self-sufficient projector module the steps of: finding the dimensions of the display, coordinates of the corresponding image in the array, and the IP addresses of all self-sufficient projector modules in the display in a Configuration Identification step using camera-based communication between adjacent self-sufficient projector modules; checking for adjacent neighboring images projected from corresponding self-sufficient projector modules using camera-based communication in a Neighbor Discovery step; and generating a seamless image by calibrating the display geometrically and photometrically in an Alignment step.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 2b is a functional block diagram of the plug-and-play projector of FIG. 2a.

Figure 1A:
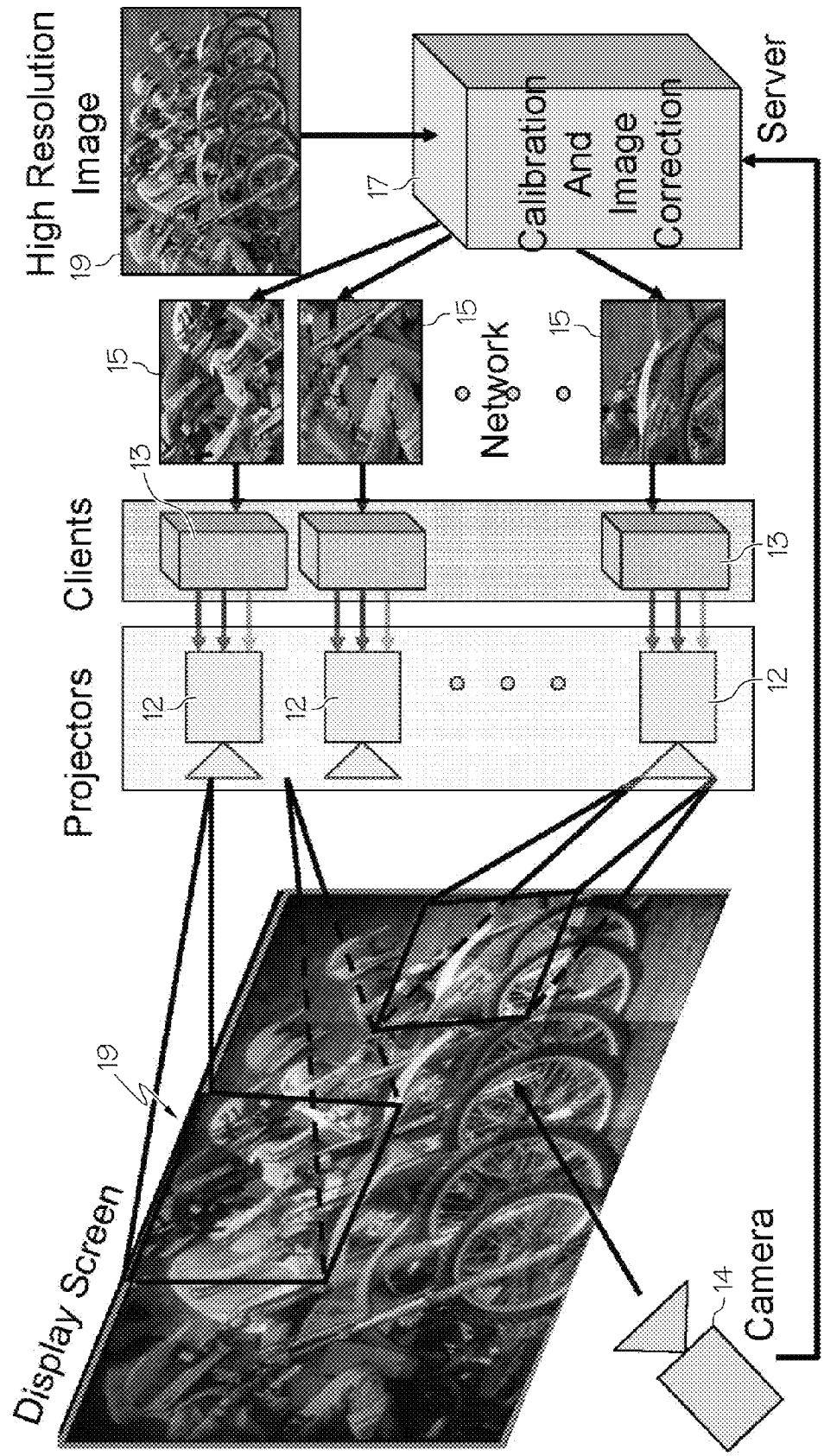
FIG. 1a is a block diagram of a prior art multiple projector display system.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

In the illustrated embodiment we disclose asynchronous distributed calibration of multi-projector displays where no central process/computer needs to know the number of projectors, their configuration, and the geometric or photometric relationship between the projectors a priori to create a seamless display.

Some of the basic elements to the illustrated embodiment are the following. First, we identify the minimal self-sufficient unit to realize distributed asynchronous calibration, namely a plug-and-play projector module (PPP) 10. PPP 10 is comprised of a projector 12, camera 14, and a computation and communication unit 16. Next, we formalize the architecture and capabilities of a display realized by the PPPs 10 via a distributed asynchronous calibration process.

We disclose five illustrative attributes of an asynchronous distributed methodology, namely methods to (1) detect the number of neighbors of a PPP 10, (2) find the position of a PPP 10 in a large display, (3) achieve geometric calibration and photometric blending in a distributed manner, (4) add and remove projectors 12 from the display dynamically for flexibility, and (5) tolerate faults for robustness. Unique to these methods is the importance of camera-based communication, namely the use of visual feedback from the PPP's camera 14 as a mode of communication. Our distributed asynchronous calibration via plug-and-play projectors 10 can be instrumental in using projectors 12 for building mobile, flexible and easily deployable displays.

One can imagine a lay user creating a display by just setting a few PPPs 10 side by side without worrying anything about calibrating them. He can also rearrange the PPPs 10 in a different configuration or add and remove PPPs 10 to the existing configuration to create a display of different aspect ratio without bothering about calibration. The PPPs 10 self-calibrate to display seamless imagery in all scenarios.

In fact, this can spark and foster new paradigms of interaction, especially for collaboration and visualization. Each person can carry his own plug-and-play projector 10 since they are cost-effective and light-weight. When more than one person meet for collaboration, their respective devices 10 can be put together to create a seamless tiled display. Even in display walls made of a large number of PPPs 10, when one or more PPPs 10 fail, the display can automatically reconfigure, recalibrate and function at a limited capability (lower resolution).

In summary, the illustrated embodiment enables self-calibrating tiled displays liberating the user from the responsibility of set-up or maintenance. In the following, we first give an overview of the system. Then we describe the basic distributed methodology that would run asynchronously on the PPPs 10 making up a multiprojector display, followed by descriptions of its advanced features: addition and removal of PPPs 10 and fault tolerance. We conclude by discussing the potential of our distributed calibration in realizing ubiquitous pixels.

Turn now to an overview of the system and compare it with the prior art. We first describe the plug-and-play projector 10, followed by the distributed calibration architecture, capabilities and assumptions.

Consider the plug and play projectors (PPP) 10 of the illustrated embodiment. Pixels, being the generalized purveyors of information, are a critical commodity in any workspace with several functionalities including collaboration, visualization and interface. The particular form of pixels provided by projectors, i.e. photons cast onto an arbitrary surface from a distance, provides a unique flexibility and mobility to this useful commodity by liberating them from the spatial constraints imposed by other displays like CRT or LCD panels. However, when used in isolation, projectors act like passive digital illumination devices, pixels which cannot provide the desired high end functionality, flexibility and mobility desired in a workspace.

Figure 2A:
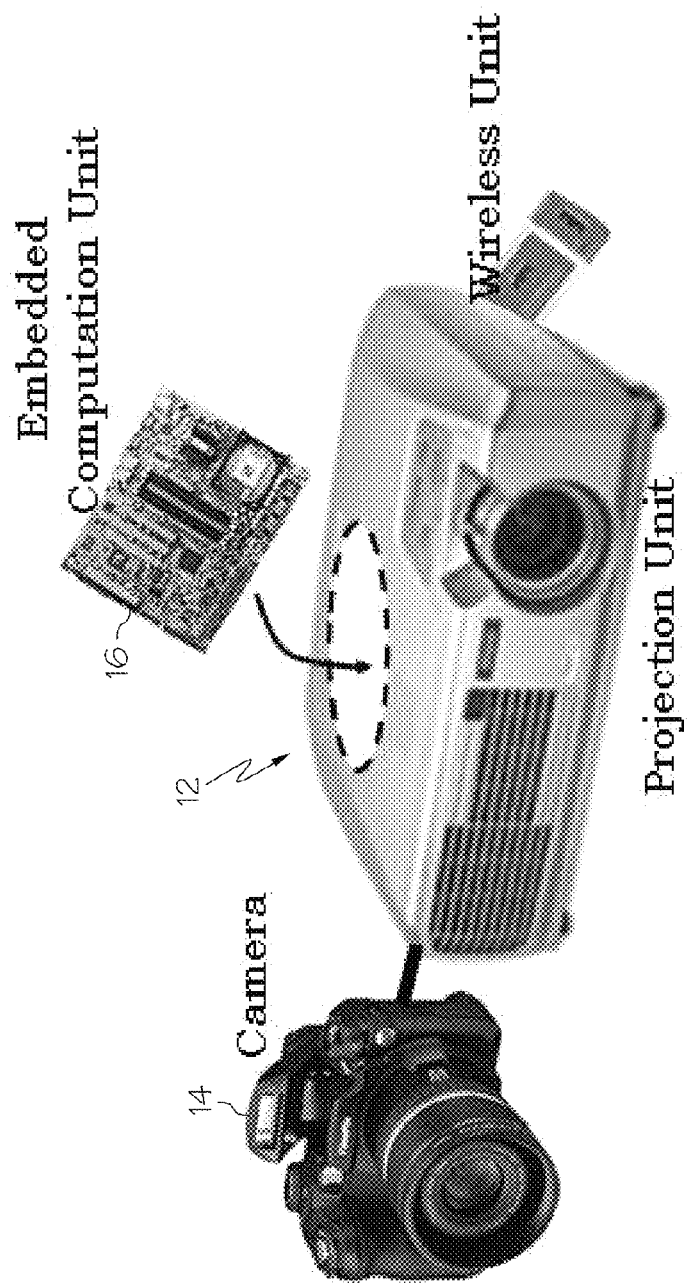
FIG. 2a is an illustration of a projector, camera and embedded unit which comprise the hardware elements of the plug-and-play projector of the illustrated embodiment.
Figure 2B:
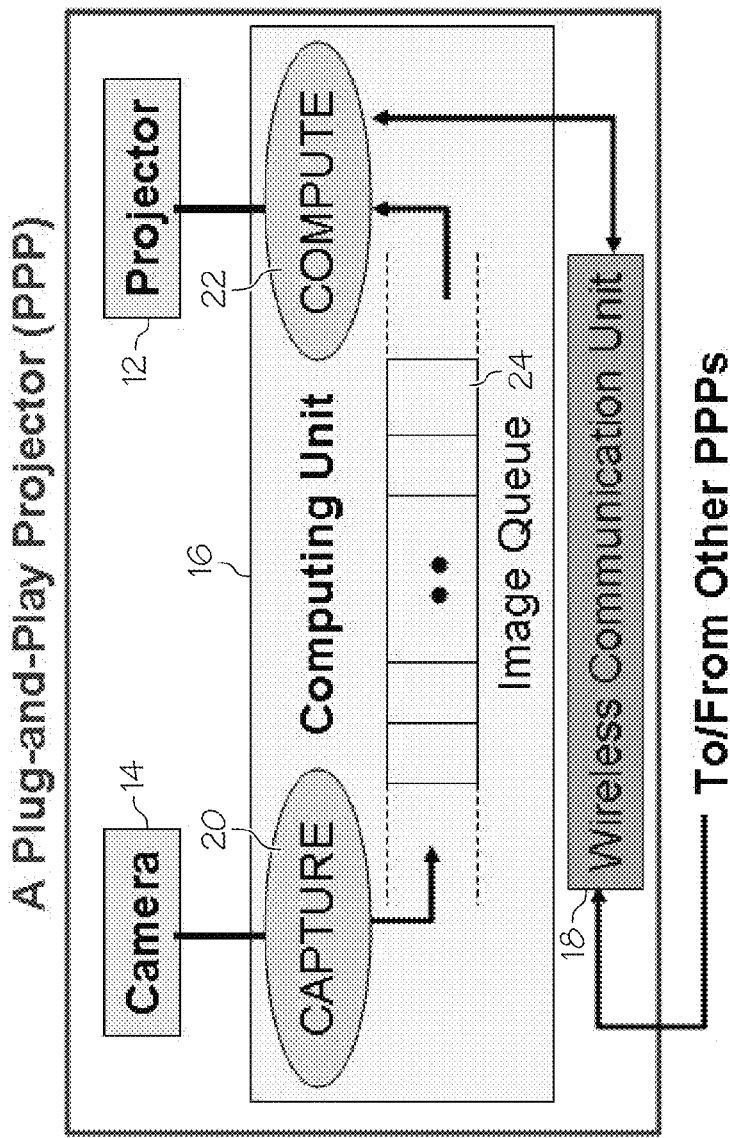

Many researchers have proposed a marriage between projectors and cameras to provide 'intelligent' pixels. FIGS. 2a and 2b are illustrations which show the hardware elements of a plug-and-play projector (PPP) 10 in FIG. 2a and a diagram of the processes used in a PPP 10 in FIG. 2b. PPP 10 is a display unit comprises a projector 12, a camera 14, and embedded computing and communication hardware or board 16. This networked and intelligent combination of elements is denoted in this specification as the plug-and-play projector (PPP) 10. Thus each PPP 10 is a self-sufficient unit with the capacity to sense environmental changes in the display through the camera 14, adapt and/or react to those changes through the computation unit 16 and share those changes with other PPPs 10 if required through the communication unit 18. These PPP modules 10 can be combined like 'plug-and-play' bricks in a wall to create a scalable and reconfigurable display.

PPP 10 includes several new features. First, unlike prior art smart projectors, the projector display and camera capture processes in the disclosed PPP 10 need not be synchronized with each other. Second, this is the first time the complete potential of camera-based communications is harnessed, not only to calibrate but even to decide the position, configuration and/or neighborhood of each PPP 10 in the display enabling a self-calibrating tiled display.

In a distributed prior art architecture, we expect every plug and play projector to take complete control of that part 15 of the display 19 for which it is responsible as diagrammed in FIG. 1a. Each plug and play projector acts like a client 13 and requests the appropriate part of the data from a traditional data server 17, that can itself be distributed. This data server 17 is oblivious to the fact that the clients 13 requesting data are in reality display units. The display units are treated just like any other data-requesting client 13. Thus distributed methodologies are used in all aspects of multi-projector display including calibration, data handling and rendering.

Figure 1B:
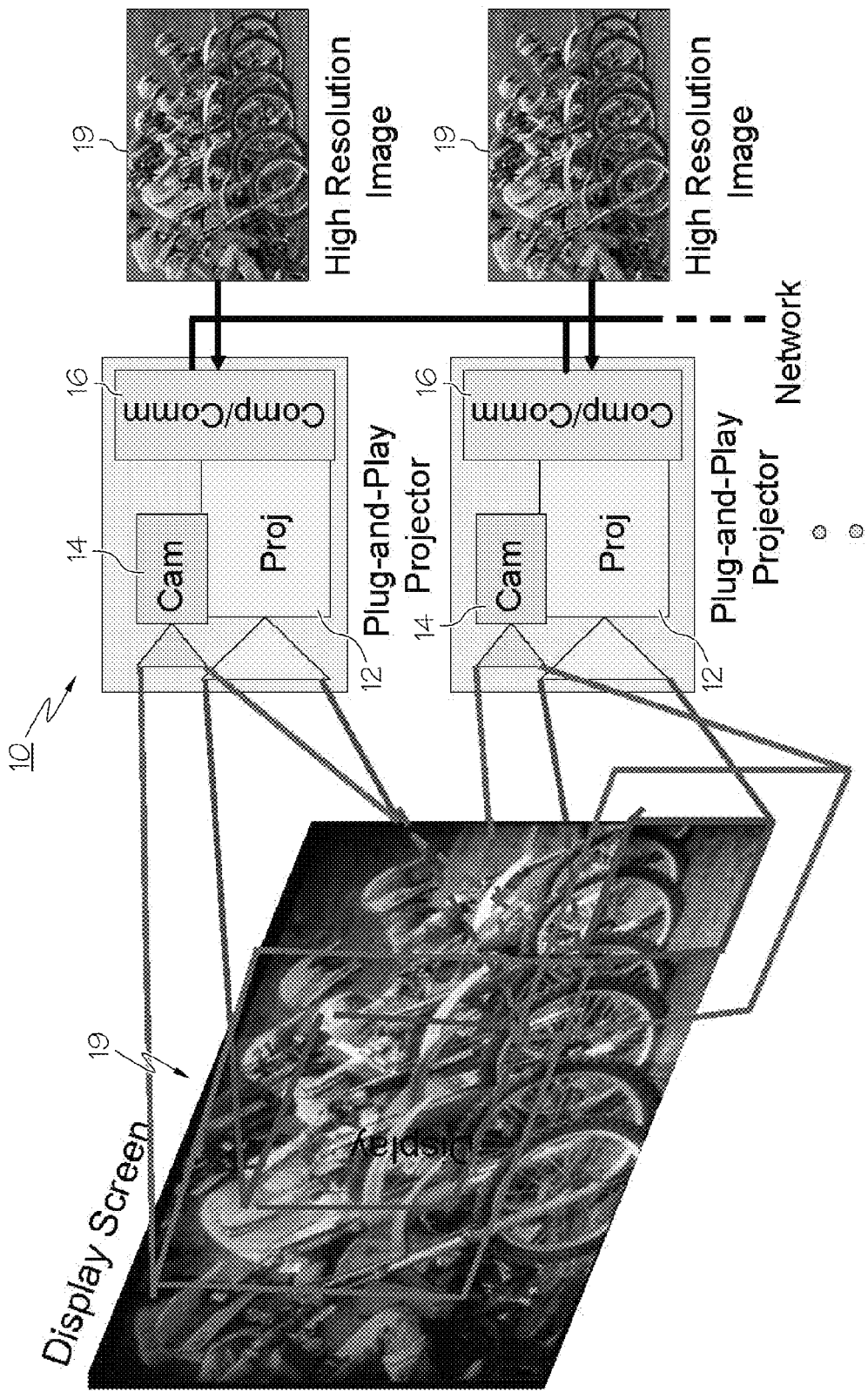
FIG. 1b is a block diagram of the multiple projector display system of the illustrated embodiment.

Existing distributed rendering architectures like Chromium and SAGE use distributed methodologies only for rendering the pixels in clients 13 and use centralized architecture for calibration and data handling in server 17. This is a clear difference between these systems and the illustrated embodiment in FIG. 1b. In Chromium or SAGE, the user defines in the central server 17, the total number of display units 13 and the relationship of the image 15 projected by each unit with respect to the larger image 19 they are creating together. The centralized unit 17 finally streams the appropriate data to the dumb display units or projectors 12.

The second advantage of the illustrated embodiment is that it uses asynchronous communication between different PPPs 10 and also between the capture and projecting processes within a single PPP 10. This enables each PPP 10 to start off as a lone unit in the display and then discover other PPPs 10 in the environment and their configurations. However, note that during display of application data, synchronization of the rendered frames is necessary. Since each display unit is just like a standard data requesting client, conventional distributed synchronization approaches can be used for this specifically defined purpose.

The disclosed distributed asynchronous architecture provides the following capabilities. First, the PPPs 10 calibrate themselves geometrically and photometrically to create a seamless imagery without any input from the user. Neither the total number of PPPs 10 making up the display and their configurations (number of rows and columns) nor the number neighbors each have and their identities are required as user inputs. While the possibility of allowing some manual user input is contemplated, the PPPs 10 are self-sufficient and there is no need for it and it is further not used in the preferred embodiment.

Second, any PPP 10 can be dynamically added to or removed from the pool of PPPs 10 to scale, reshape, and/or reconfigure the display. Third, in case of faults in PPPs 10, the display reconfigures itself automatically to a reasonable predetermined shape.

The following are the assumptions that are made about the projector-camera setup in the PPP 10. First, the camera 14 of the PPP 10 has a wider field-of-view (FOV) than the projector 12. Thus, the camera 14 can see the image projected by its projector 12 completely and also parts of the images projected by the neighboring PPPs 10. We assume that the camera 14 can see about one third of the field-of-view of the projectors in neighboring PPPs 10.

Second, since each camera 14 captures a small part of the display, we use a low-resolution (640×480) inexpensive VGA video camera in the illustrated embodiment. This choice is to be understood as illustrative only and by no means limits the scope of the invention as claimed.

Third, the camera and projector coordinate systems of a PPP 10 and its neighbors are rotated by less than 45 degrees with respect to each other, which is a reasonable assumption for a rectangular array of PPPs 10 on a planar display. Again, this a preference in the illustrated embodiment and is not a limitation of the scope of the invention.

Fourth, the cameras 14 need not be synchronized with the projector 12 in the PPP 10. However, following Nyquist sampling criteria, the frame rate of the camera 14 should be double of that of the projector 12 to assure that a pixel pattern projected by the PPP 12 or the adjacent PPP 12 is not missed by the camera 14. If this criterion is not satisfied, projectors 12 have to project their calibration patterns for more than one frame during calibration.

Consider now the role of camera based communication. Since each PPP 10 can sense changes in its neighbors via its own camera 14, a sensor/camera based communication mode is established between adjacent PPPs 10 via analysis of the captured image. This communication channel enables critical capabilities like discovering local topology of the PPPs 10 in the display array and detecting addition or removal of neighboring PPPs 10. Camera-based communication can be used to communicate any information with no network overhead and hence can completely replace a network-based communication channel. However, camera-based communication is computation-intensive. So, the illustrated embodiment includes a low bandwidth wireless communication unit 18 on each PPP 10 to allow network-based communication for tasks that would otherwise require complex computationally intensive image processing. Thus, in the illustrated embodiment we use both network-based and camera-based communication effectively to balance the computational and network resources of the system. However, other design choices could be made to accommodate such demands without departing from the spirit and scope of the invention.

The asynchronous distributed calibration methodology follows a single-program multiple-data (SPMD) model in which every PPP 10 executes exactly same program. We disclose in this embodiment our method for a display using a fixed number of projectors. We augment this basic algorithm with more advanced capabilities below. Each PPP 10 runs two asynchronous processes, a Capture process 20 and Compute process 22 as diagrammatically depicted in the right side of FIG. 2, that communicate via a shared queue 24 of images, and a shared Boolean program, CALIB. The Capture process 20 captures images from the camera 14 and en-queues them in queue 24. It only stores the images that reflect a change when compared to the last image en-queued in queue 24. The Compute process 22 de-queues images from queue 24, analyzes them, and computes different configuration and calibration parameters. It is assumed that when the Compute process 22 sends an image to be displayed on the projector 12, it keeps it projected unless and until asked to display another one. CALIB is used to denote the state of the PPP 10. A PPP 10 can be in two states, namely (a) the calibration state when it calibrates itself and (b) the stable state when it projects application data on the display. Capture and Compute thus act like producer-consumer processes traditionally used in a distributed computing environment, and are assured mutual exclusion while accessing shared data structures.

Following are the SPMD algorithms for these processes. Parts of these programs handle addition and removal of PPPs 10 and faults that are explained below. Consider first the algorithm for Process-Capture Image-Queue and Boolean CALIB.

```
begin
    1. I = Capture Image from Camera;
    2. if CALIB then
    3.     if (I is different from previous image in queue) then
    4.         Enqueue I in queue;
    5.     endif;
    6. else
    7.     Addition-Removal-Handling-for-Capture
    8. endif;
end
```

Figure 3A:
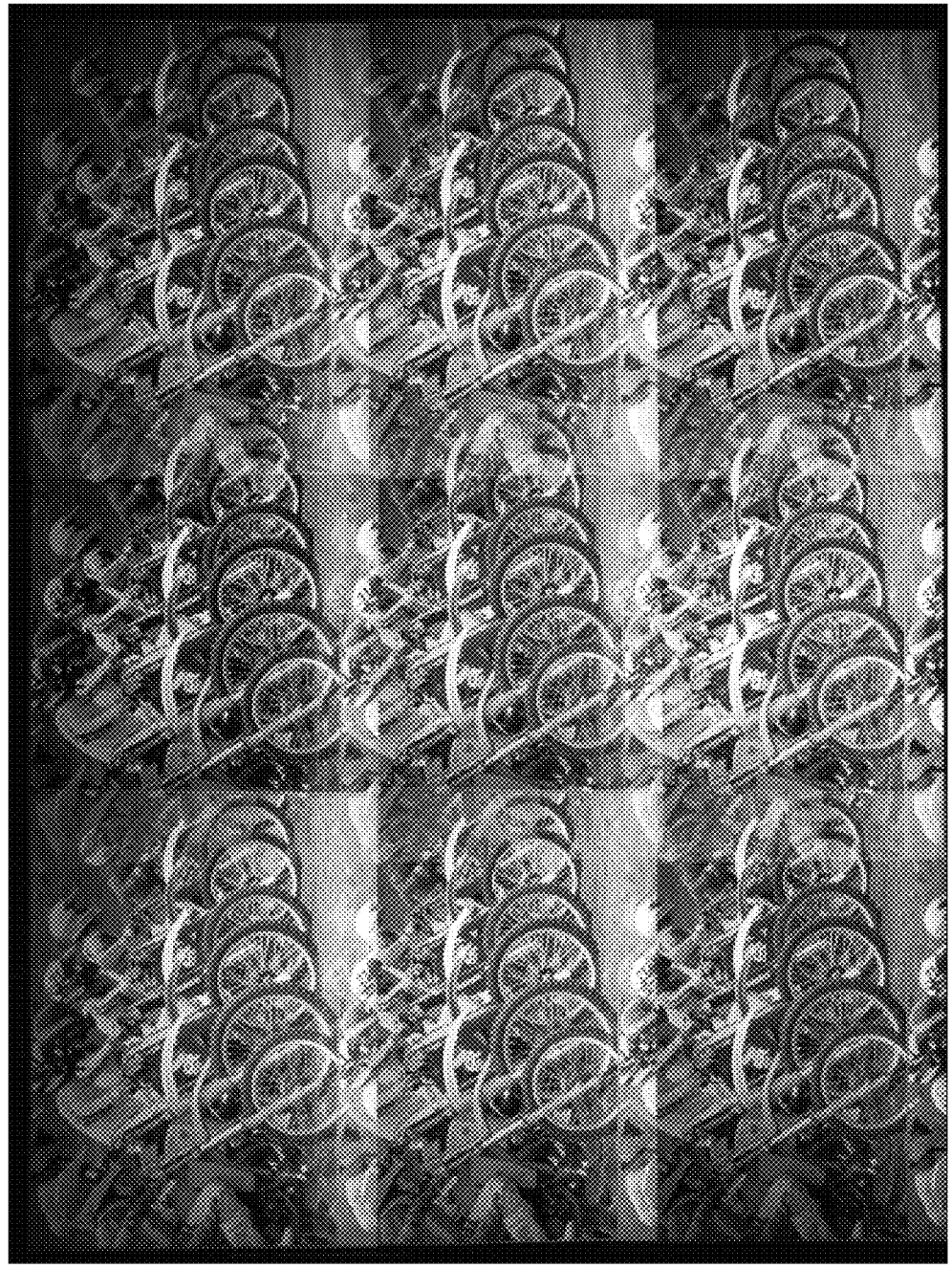
FIGS. 3a-3d are illustrations of steps whereby multiple projectors of the illustrated embodiment assemble a composite large display.
Figure 3B:
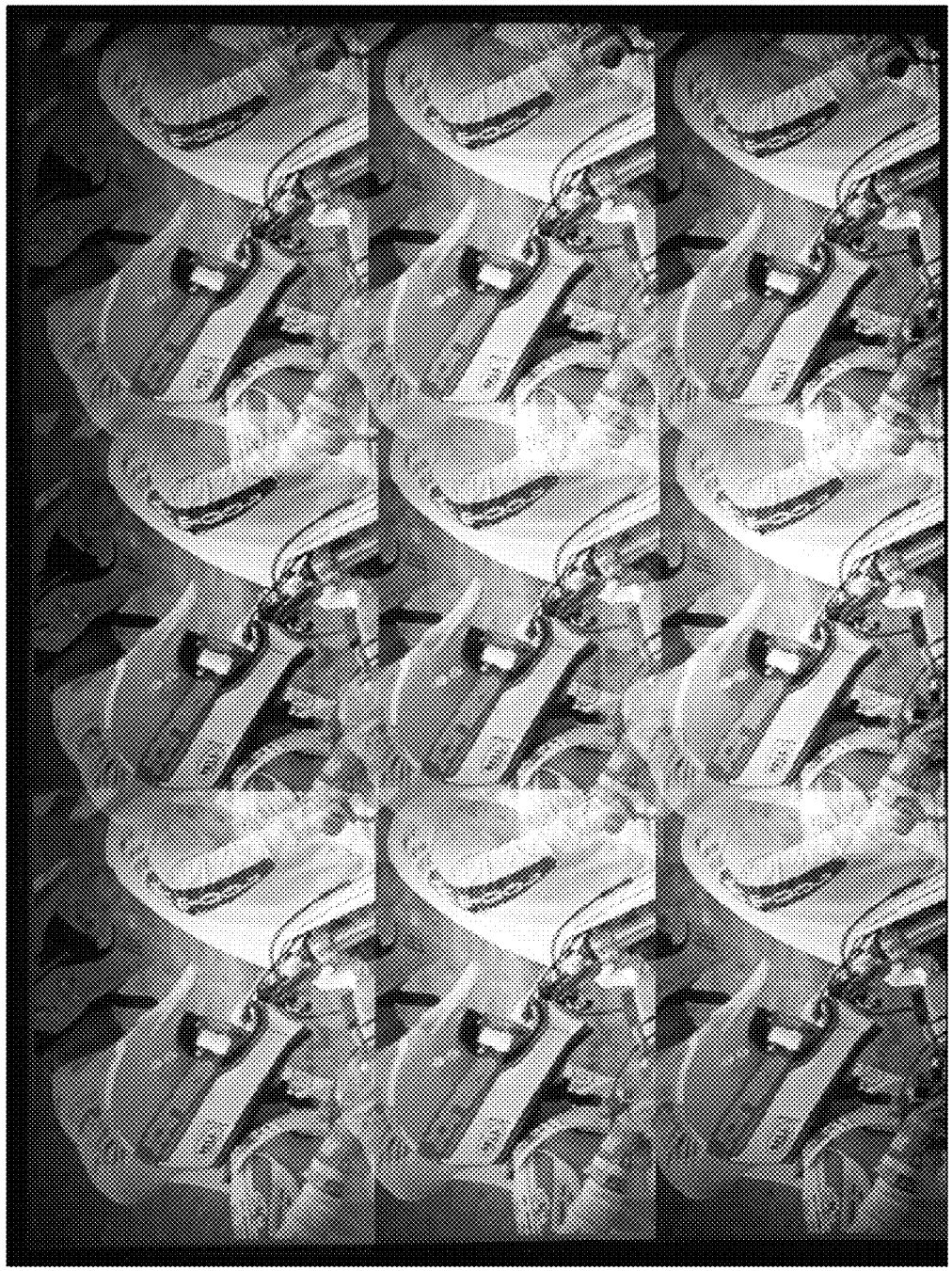
Figure 3C:
Figure 3D:

Turn now and consider the algorithm process-compute image-queue and Boolean CALIB. The Compute process 22 is the core of the method. The asynchronous distributed method starts running as soon as the projector 12 is powered on and involves three steps. FIGS. 3a-3d illustrate the perception of each PPP 10 about the presence of other PPPs 10 in the environment and its configuration at the end of each of these steps. FIGS. 3a-3d illustrate a multi-projector display using of nine PPPs 10. If these nine PPP's 10 were allowed to project data in FIG. 3a at the time of power-on, they would display the entire data since each PPP 10 thinks it is the lone display unit responsible for data display. FIG. 3b illustrates the state at the beginning of Configuration Identification step when PPP 10 is aware that other PPPs 10 will share the responsibility of data display, but thinks that it's position is (1,1) and it displays the first 1023×768 part of the image. FIG. 3c illustrates the state after the Configuration Identification step displays the right part of the image, which is still geometrically and photometrically uncalibrated. FIG. 3d illustrates that after the Alignment step, the PPP's 10 will project a seamless image. FIG. 3d is the only image that the user would see, and the illustrations of FIGS. 3a-3c are shown here only for the

```
        purpose of explanation and illustration.
        Algorithm Process-Compute
        Image-Queue Q;
        Boolean CALIB;
        begin
        1.    CALIB = True;
        2. if (CALIB) then
        3.        Neighbor Discovery;
        4.        Configuration Identification;
        5.        Photometric Blending;
        6.        Geometric Alignment;
        7. else // Stable state
        8.        Request Data from Server;
        9.        Correct and Project Data;
        10.       Addition-Removal-Handling-for-Compute
        11. endif;
        end
```

In the Neighbor Discovery step each PPP 10 checks for the existence of left, right, top or bottom neighbor using camera-based communication with adjacent PPPs 10. In the step, Configuration Identification, PPPs 10 find the dimensions of the display array, their own coordinates in the array, and the IP addresses of all PPPs 10 in the display. Camera-based communication between adjacent PPPs 10 and network broadcast are used for this purpose. In the Alignment step, a seamless image is generated by calibrating the display geometrically and photometrically using network based communication. For geometric alignment a distributed homography tree technique is used. In the Photometric step intensity blending is used in the overlapping regions to achieve photometric seamlessness.

Figure 4A:
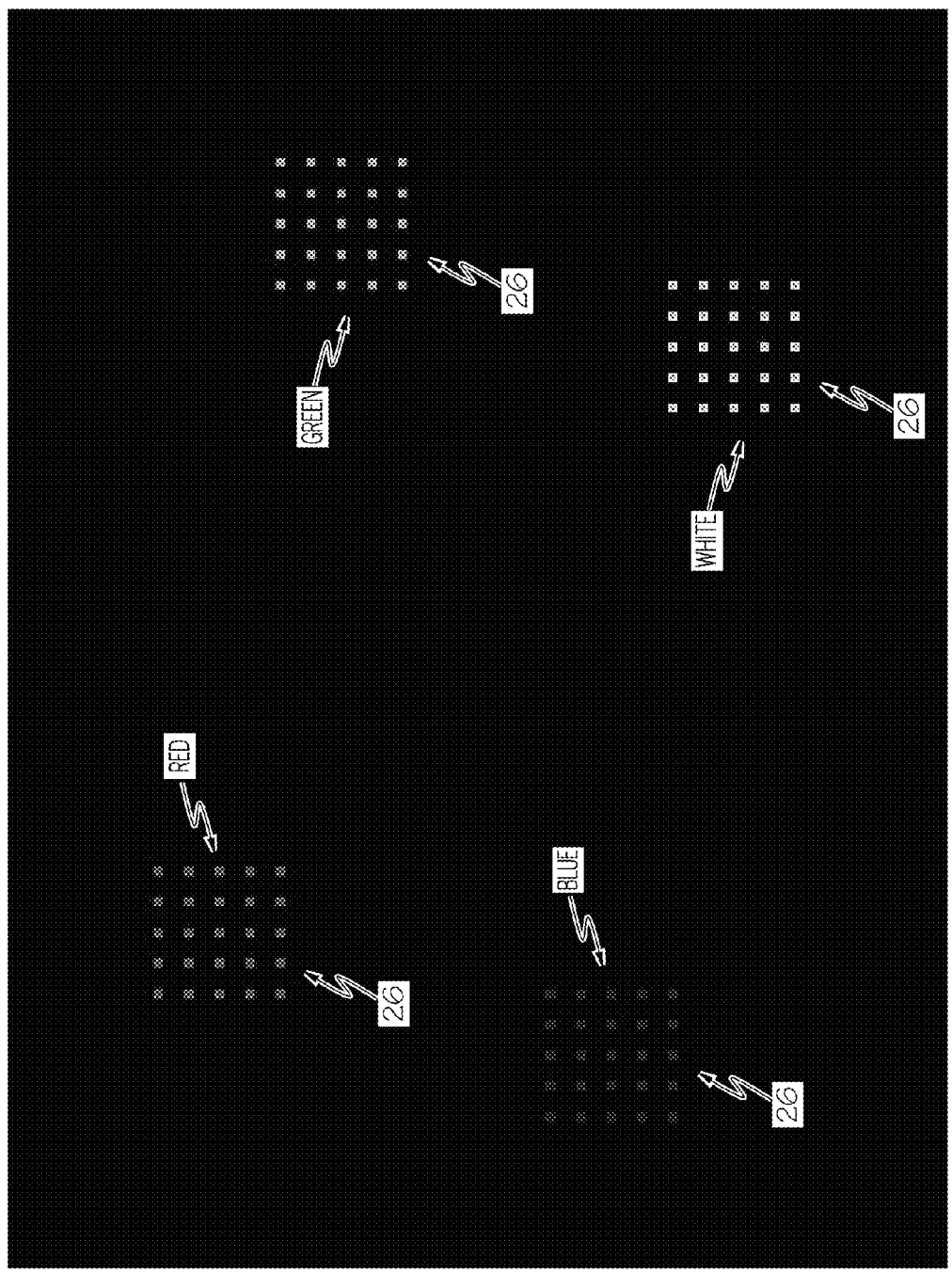
FIGS. 4a-4d are illustrations of steps whereby multiple projectors of the illustrated embodiment identify and locate the projected displays of neighboring projectors.
Figure 4B:
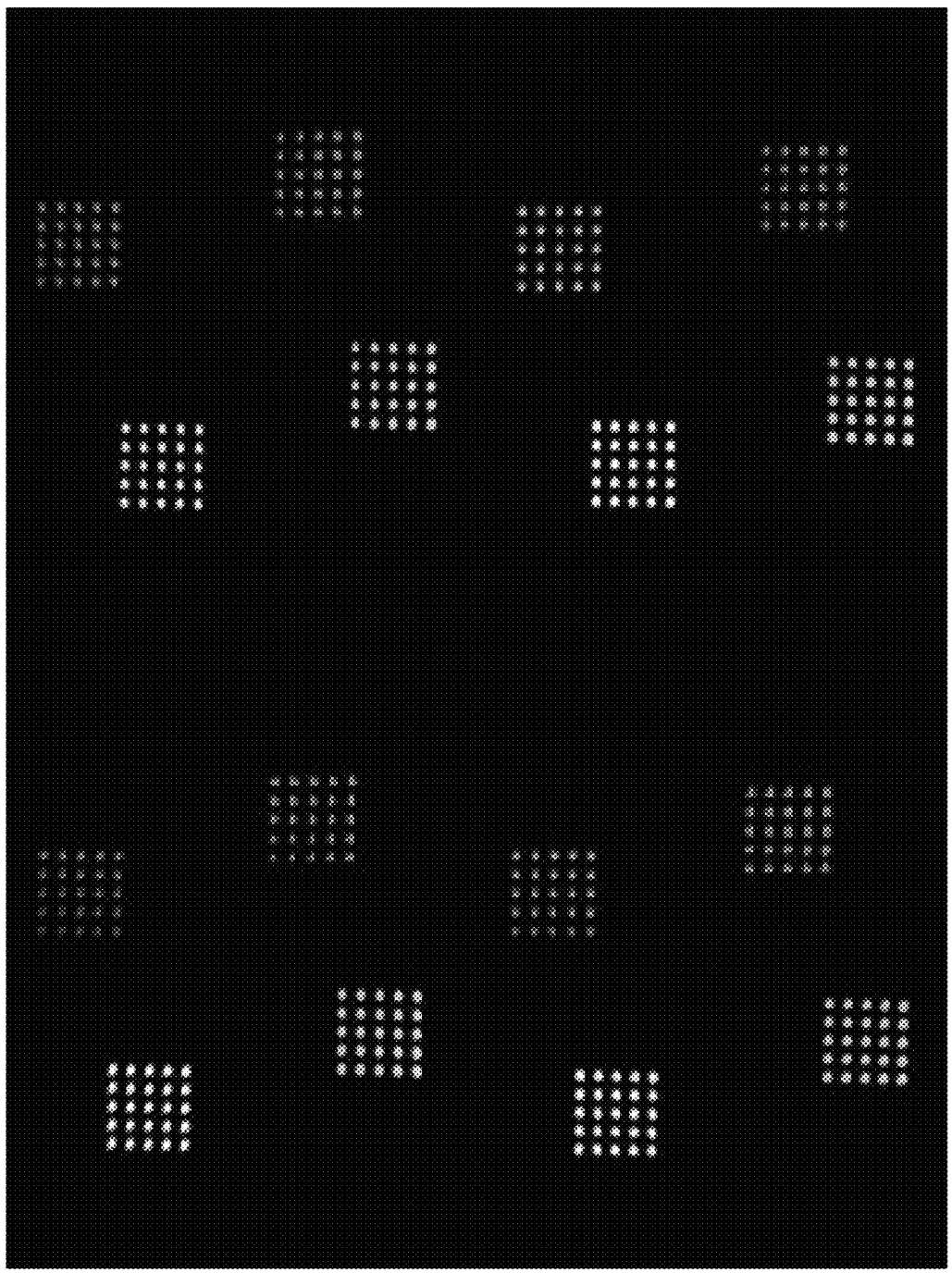
Figure 4C:
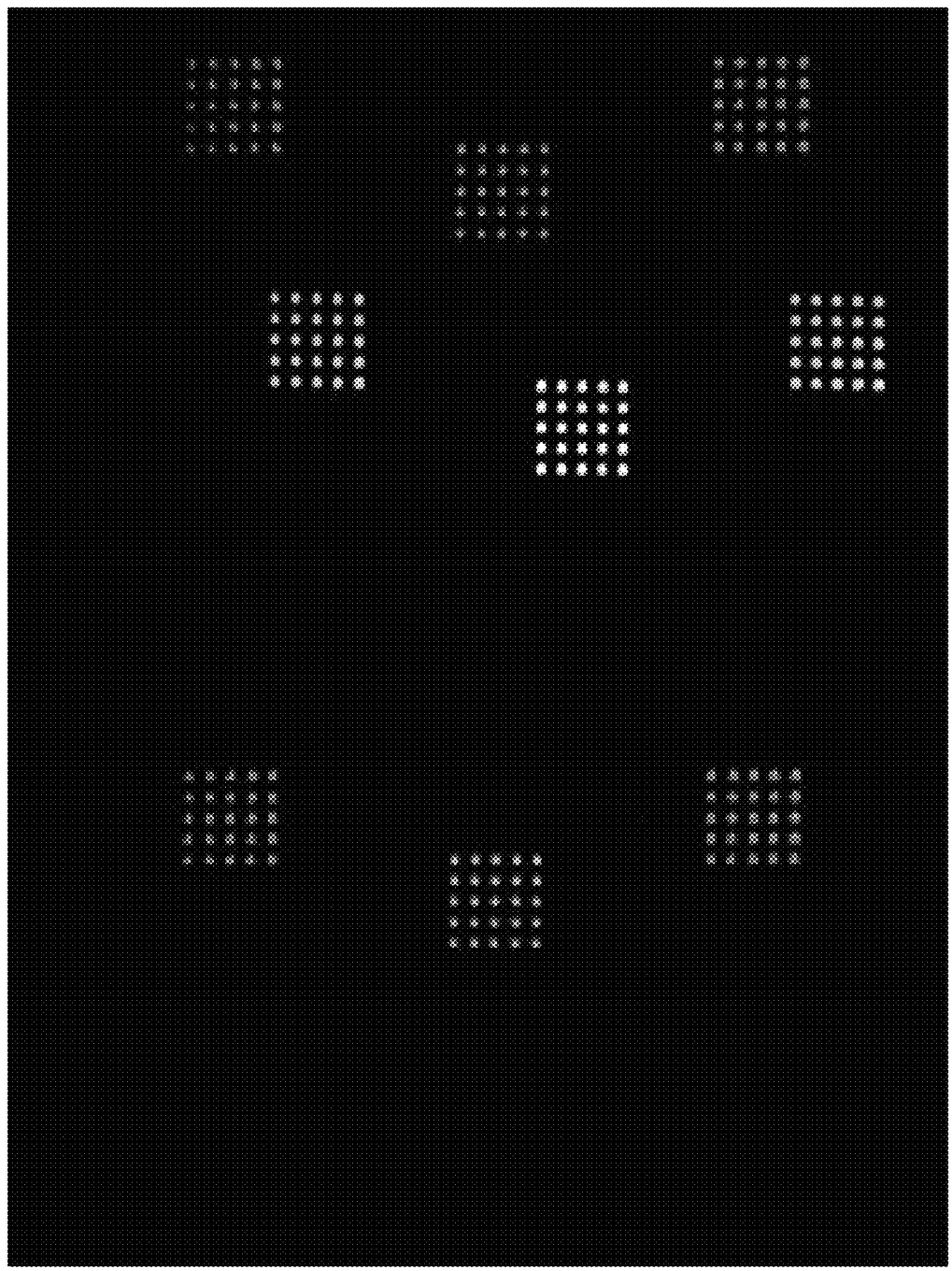
Figure 4D:
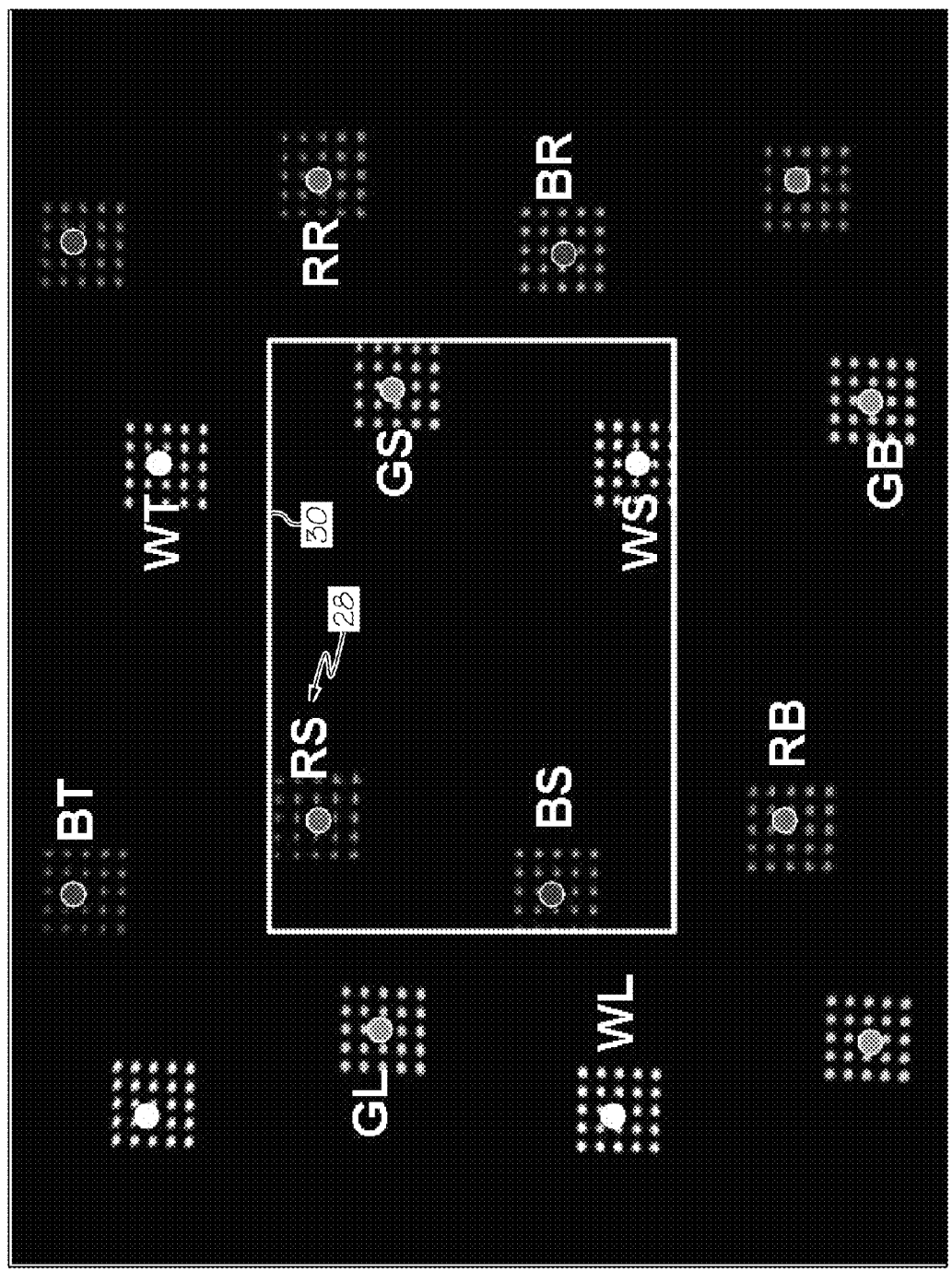

Consider the Neighbor Discovery step now in greater detail as illustrated in FIGS. 4a-4d. In FIG. 4a the pattern projected by the projector 12 of a PPP 10 in Neighbor Discovery step is shown. FIG. 4b shows the pattern seen by the camera 14 of a PPP 10 when all its adjacent projectors 12, and itself are projecting the pattern shown in FIG. 4a. FIG. 4c shows the pattern seen by the camera 14 of a PPP 10 when only two of its neighbors and itself are projecting the pattern. Due to the asynchronous nature of the system, there is no guarantee that all the PPPs 10 project their pattern at the same time and this situation is likely to occur. FIG. 4d shows the blob 26 cluster centers 28 and bounding rectangle 30 used to determine cluster ownership.

The Neighbor Discovery step starts with the assumption that none of the four neighbors (left, right, top or bottom) of a PPP 10 exist. Each PPP 10 projects a pattern comprised of clusters 32 of colored blobs 26. The image captured by the camera 14 of a PPP 10 contains clusters 32 from its own and part of the neighbor's projected pattern. The patterns are designed such that the colors and locations of the clusters can be analyzed to detect the presence and absence of the four neighbors. In the illustrated embodiment the pattern includes four clusters 32, each made of 5×5 array of square blobs 26 as diagrammatically depicted in the example of FIG. 4a. The locations of these clusters 32 are optimized to avoid overlap of the clusters 32 projected by adjacent PPPs 10 and determine the maximum allowable overlap between adjacent PPPs 10. The pattern of the illustrated embodiment allows a maximum of 200 pixels overlap (20% of the projector's resolution). It is entirely within the scope of the invention that other degrees of overlap or patterns could be equivalently substituted. Each cluster 32 has a different color, e.g. red, green, blue or white respectively in top-left, top-right, bottom-left and bottom-right corners of the image. This allows a PPP 10 to differentiate the clusters 32 projected by itself from those projected by its neighbors. Pseudocode Neighbor-Discovery-In-Compute is an algorithm that generates the neighborhood information.

```
        begin
        1.    Project Pattern;
        2.    / = Dequeue image from non-empty Q;
        3.    Find all clusters in /; (Spatial Clustering)
        4.    Find color, owner and centroid of each cluster;
        5.    Create global Chromatic Blob Tables (CBT)
              a. for red, green, blue and white;
        6.    Update neighborhood information;
        end
```

Turn now to the step of Identifying Location of the Clusters in more detail. First, we identify the centers 28 of the blobs 26 using conventional blob detection techniques. Next, we spatially group the detected blobs 26 into an array of clusters 32. We use a conventional hierarchical agglomerative clustering approach that has time complexity of $O(n^2 \ln(m))$, where n is the total number of blobs 26 in the image and m is the dimension of each cluster 32 which is five (????? Four) in the illustration. This method does not need as input the total number of blobs 26 present in the image and hence can handle asynchronous display of patterns from adjacent PPPs 10. Pseudocode Spatial-Cluster-in-Neighbor-Discovery has an input which is an array Blob of (x,y) of the coordinates of the blobs 26 and an output which is an array Cluster such that if Blob [i] and Blob [j] belong to same cluster, then Cluster[i]= Cluster[j].

```
   begin
        1. for i= 1 to n
        2. Cluster[i] = i;
        3.      for j=1 to n
        4.          d[i][j] = dist(Blob 26[i],Blob 26[j])
        5.      endfor
        6. endfor
        7. threshold = 2*min(d);
        8. change = true;
        9. while change
        10.change = false;
        11.for i=1 to n
        12.     for j= 1 to n
        13.         if (d[i][j] i threshold) AND (Cluster[i] ↓Cluster[j])
        14.              Cluster [i] = Cluster [j];
        15.              change = true;
        16.         endif
        17.     endfor
        18.endfor
   end
```

Next, the color of each cluster is determined in three steps by the algorithm, Identifying Color of the Clusters: First, the color of each blob 26 is detected by applying chromatic filters centered at the blob centers 28. The detected colors, being in the camera's color space may not coincide with the projected colors due to variations between the camera and projector color gamuts. So, we assign to each blob 26 the projected color that has the minimum angular deviation with the detected color, in RGB space. Second, due to small gamut variations across the projector 12 and camera 14, all blobs 26 in a cluster 32 may not be assigned the same color. So cluster color is determined by majority voting of the colors of component blobs 26. Third, each PPP 10 creates a Chromatic Blob Table (CBT) for each color. The CBT lists the centers 28 of all detected blobs 26 in the camera coordinates along with the ID, color, and center of the cluster 32 to which they belong.

Any cluster 32 detected by the PPP 10 in the previous step either belongs to itself or to its adjacent PPP 10. We identify the owner of each cluster 32 using the algorithm, Identifying Owners of the Clusters, in the following three steps. We consider four connected neighbors and do all computations on the centers of clusters 32. First, since each PPP 10 is guaranteed to see its own pattern before or along with the pattern of adjacent PPPs 10, first an axis-aligned bounding rectangle 30 enclosing the PPPs 10 own clusters 32 is deciphered as diagrammed in FIG. 4*d*. This can be done by finding the minimum x from the red and blue, maximum x from the green and white, maximum y from the blue and white and minimum y from the red and green CBTs. Second, each cluster 32 is assigned its closest corner in the rectangle 30. Third, based on the color of the cluster 32 and its associated rectangle corner, the ownership of the cluster 32 is resolved. For example, three clusters, red, green, and white, associated with the top right corner of the rectangle 30 belong to the right neighbor, self, and top neighbors respectively. FIG. 4*d* shows the centers of the chromatically classified clusters 32 and labels these centers to denote their ownership. The first letter of the labeling denotes the color (RGBW) and second letter denotes the ownership (S for self, and LRBT for left, right, bottom, and top for its four neighbors). The CBT is also updated to include the owner of each cluster 32. Further, for each PPP 10, its neighborhood information is also resolved during this process.

In the Configuration Identification step, each PPP 10 finds the display array's dimensions, its own coordinates in the display array, and the IP addresses of all the PPPs 10 in the display. Binary coded bit patterns embedded in the cluster 32 of blobs 26 are used to convey each PPP 10's beliefs about where it is in the display, and the total dimensions of the display. Every PPP 10 starts by believing that it is the only node in a display of dimension 1 by 1. Multiple rounds of camera-based communication between adjacent projectors 12 follow when each PPP 10 updates its own row (r) and column (c), and the total rows (m) and columns (n). Update rules enable propagation of these parameters to all the PPPs 10 in the display. This results in convergence to the correct configuration at each PPP 10. This is followed by a network-based communication step where each PPP 10 gathers the IP address of all other PPPs 10 in the display. The detailed description of the pattern and process is shown in the Pseudocode Configuration-Identification-in-Compute.

```
begin
   1.   global r = c = m = n = 1;
   2.   global r_s = c_s = m_s = n_s = isdone = FALSE;
   3.   if (I am the top-left PPP) then
   4.      r_s = c_s = TRUE;
   5.   endif;
   6.   do
   7.      Encode bits in Grids and Project ID Pattern;
   8.      / = De-queue image from non-empty Q;
   9.      if all blobs in / present in CBTs then
  10.         Detect the IDs of the neighbor;
  11.         Update r,c,m,n and the status; (Update-IDs)
  12.      else // New neighbor is detected
  13.         Project Neighbor Discovery Pattern;
  14.         Find new grids in / and add to CBTs;
  15.         Update neighborhood information;
  16.         Reset (r,c,m,n) to 1 and status bits to FALSE;
  17.         if (I am the top left PPP) then
  18.            r_s = c_s = TRUE;
```

```
  19.            endif;
  20.         endif;
  21.until isdone;
  22.Broadcast MSG(IP,r,c);
  23.for i = 1 to m×n do
  24.      Receive Msg from non-empty Msg-Buf;
  25.      Create and Update IP-Address-Table;
  26.enddo;
  27.Fault-Handling;
end
```

Figure 5A:
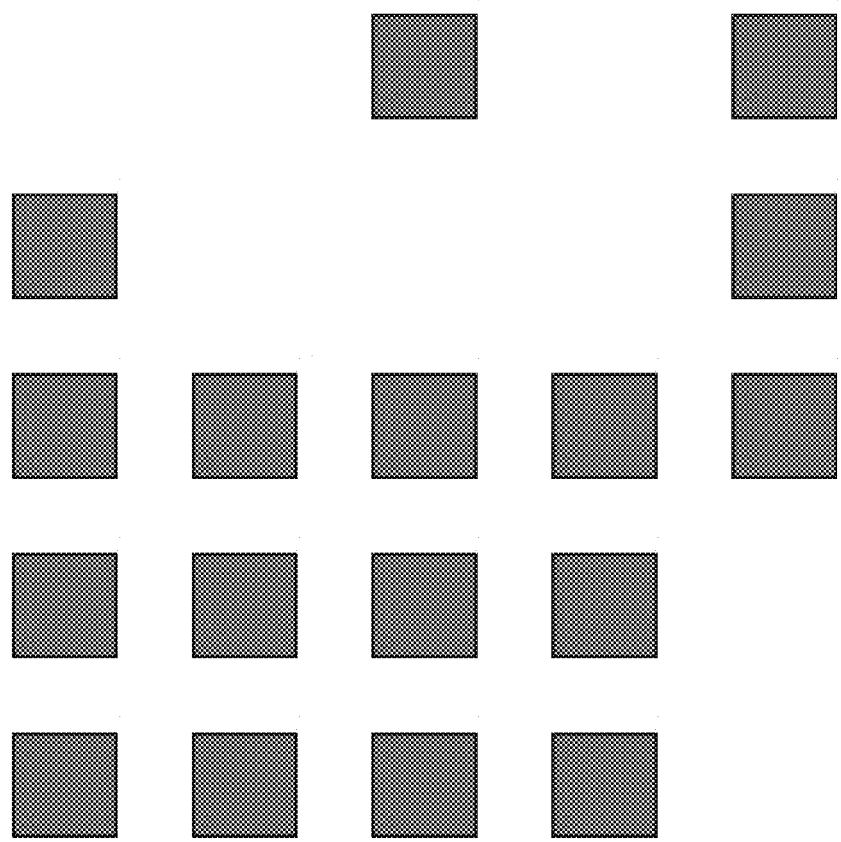
FIGS. 5a and 5b are enlargements of two of the blobs of FIGS. 4a-4d providing examples of the encoding in the blob.
Figure 5B:
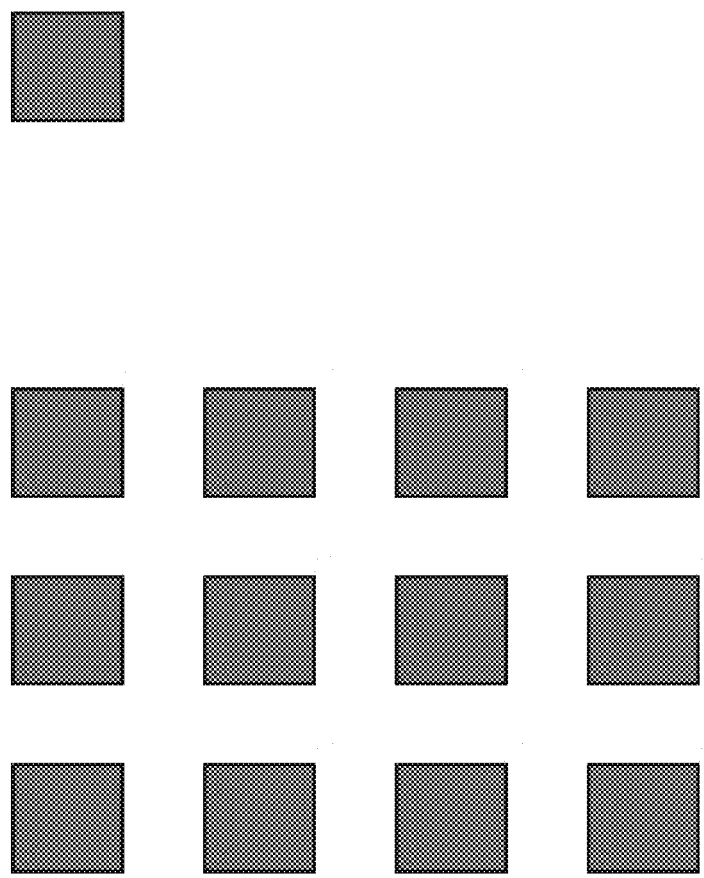

The pattern for this step is derived by binary encoding all the clusters similarly. Each blob 26 denotes 1 when off and 0 when on. The first two rows are used to encode the row r and column c of the PPP 10, and the third and fourth rows are used to encode the total number of rows and columns, m and n respectively. The last row is used to denote five status bits. The first four bits denote if r, c, m and n have converged to the final correct values on this PPP 10. The final bit isdone is turned on when all of the four status bits are set to denote the completion of the configuration identification process on this PPP 10. FIGS. 5*a* and 5*b* show an example of the binary encoding. FIG. 5*a* shows a binary encoded grid with (r,c)=(1, 3), (m,n)=(2,3), (rs,cs)=(True,True) and (ms,ns, isdone)= (False,False,False) and FIG. 5*b* shows (r,c)=(2,3), (m,n)=(3, 3), (rs,cs)=(True,True) and (ms,ns, isdone)=(Ture,True, True).

Turn now and consider the step of Finding Display Dimensions and PPP Coordinates. Each PPP 10 starts configuration identification by setting its (r,c) and (m,n) to (1,1) and all its status bits to False, and projecting an image representing this state. Then, each PPP 10 performs the following steps in an iterative manner until isdone is set indicating its convergence to the correct values of (r,c) and (m,n). First, the PPPs 10 capture the image of the encoded bit patterns and decipher the (r,c), (m,n) and the status bits of the neighbors from the image captured by the camera 14. This is done by analyzing the presence or absence of blobs 26 at the blob centers 28 stored in the CBTs. Next, this information is used to update its own (r,c) and (m,n) and status bits following some update rules. Pseudocode Update-IDsin-Configuration-Identification performs this step.

```
begin
   1. (r,c) = (max(r(L), r(T)+1),max(c(L)+1,c(T));
   2. r_s = (T = 0) || (r_s(L) || (r_s(T);
   3. c_s = (L = 0) || (c_s(L) || (c_s(T);
   4. (m,n) = (max(r,m(B),m(R)),max(c,n(B),n(R)));
   5. m_s = r_s&((B = 0) || (m_s(R) || (m_s(B));
   6. n_s = c_s&((R = 0) || (n_s(R) || (n_s(B));
   7. isdone = m_s&n_s&r_s&c_s;
end
```

Finally, the PPP 10 changes the embedded binary coding in its clusters and projects an updated image representing the new state. The above steps on each PPP 10 result in propagation of the values of the encoded parameters in the following way. First, the PPP 10 with no left and top neighbor (top-left PPP 10 in the array) initiates the process and indicates that its (r,c) of (1,1) has converged by setting appropriate status bits. Second, each PPP 10 updates its (r,c) parameters from the top or left neighbor. This process continues and the row and column changes propagate from the top-left of the display to the bottom-right in a breadth-first manner, where PPPs 10 in the same level of the tree perform updates in parallel. This front propagation of (r,c) completes in O(ln(mn)) steps.

Third, when the bottom right projector detects convergence of its (r,c) parameter, it sets the (m,n) to be the same as its (r,c) and turns on its isdone status bit to indicate convergence to the correct configuration parameters. Fourth, each PPP 10 now updates its (m,n) and isdone from the bottom or right neighbor, leading to a back propagation of parameters from the bottom-right to top-left of the display, again in a breadth-first manner in O(ln(mn)) steps. Thus each PPP 10 discovers the correct configuration parameters using only camera-based communication between adjacent projectors. Finding IP addresses of all PPPs 10: Next, each PPP 10 broadcasts its coordinates in the two dimensional array along with its associated internet protocol, IP, address over the network. On receiving this broadcast message, each PPP 10 updates a table that maintains the coordinates of every PPP 10 in the display along with the associated IP addresses. This step enables network communication between adjacent PPPs 10 during alignment. Note that this step can be done before discovering the total number of display units and their configurations via a standard communication protocol like UPnP or Apple's Bonjour/ex-Rendez-Vous/ZeroConf. However, using a conventional protocol does not allow a seamless integration of this step with the rest of the calibration methodology.

Consider the handling of race conditions: In an asynchronous system, it is possible that a neighbor of a PPP 10 is performing its neighbor discovery step while the PPP 10 is in its configuration identification step. This situation is detected by identifying appearances of new blobs 26 in the captured image that are not present in the CBT. To handle this race condition, the PPP 10 aborts its current step and goes back to the Neighbor Discovery step where it lets its neighbor know of its presence. It indicates this abortion by turning off its convergence bits which enables propagation of this information to other non-adjacent PPPs 10. This also allows all the PPPs 10 in the display to stall their convergence until information from the new PPP 10 propagates.

Turn to the Alignment step. In this step the PPPs 10 find their exact geometric relationship with each other (amount of overlap, relative alignment of images) and use it for geometric alignment and photometric blending. First, each PPP 10 uses the Hungarian method to detect correspondence between the blobs 26 in the CBTs with those in the projected pattern and computes the local homography with each neighbor. This, in turn, is used to compute the overlap with its neighbors and blend it photometrically. To align the images geometrically, we provide a distributed homography tree technique that aligns the images from all PPPs 10 with respect to one reference PPP 10 to achieve a seamless display.

```
begin
    1. Root = FALSE;
    2. forall neighbors ≠ 0 do
    3.      Compute Local Homography to Neighbor;
    4.      Find Overlap with Neighbor and Apply Blending;
    5. endfor
    6. if (I am the center PPP) then
    7.      Root = TRUE; Homogrphy-to-Root = I;
    8. else
    9.      (H,S) = Receive Homography H and sender ID S from non-
            empty Msg-Buf;
    10.     Homography-to-Root = H× Homography-to-S;
    11.endif
    12.Send MSG(Homography-to-Root, myID) to all neighbors;
    13.Clean Up Msg-Buf to delete unused homographies;
end
```

Consider the Correspondence Detection Using Hungarian Method in greater detail. Prior art methods would correspond detected blobs 26 in the camera space with the projected blobs 26 in two different ways: (1) binary code the blobs 26 and project them in a time sequential manner; (2) project all blobs 26 in one frame and then determine some distance parameters to walk along the blobs 26 in a scan-line order in projector coordinate space. Usually additional patterns are projected to calibrate these parameters. Both prior art methods use multiple patterns for correspondence detection. In an asynchronous distributed system of the illustrated embodiment, tracking multiple frames from each PPP 10 is not viable.

We provide a new way to detect correspondences based on the known Hungarian Method. The Hungarian Method is a strongly-polynomial combinatorial optimization algorithm due to Kuhn, The Hungarian Method for solving the assignment problem, Naval Research Logistics Quarterly, 2:83-97, 1955, and later revised by Munkres, Algorithms for the assignment and transportation problems, Journal of SIAM, 5:32-38, 1957. It is used to solve bipartite matching (i.e., the assignment problem). The spatial clustering that generates the clusters in the Neighbor Discovery stage does not impose any order to the clustered blobs 26. To find the order, we generate a generic template by finding the axis aligned bounding rectangle 30 for the detected cluster and populating it with a 5×5 array of indexed blobs 26. Then, a cost matrix is computed by taking the Euclidean distance between every detected-template blob 26 pair. Each element represents the "error" induced when suggesting that particular assignment. The Hungarian algorithm then operates on this matrix to find the assignment of detected-blobs 26 to template-blobs 26 that minimizes total assignment error (the sum of the square of all distances). Thus, we order the blobs 26 robustly and automatically. From the known order and color of the blobs 26 we can find the exact correspondence of blobs 26 between the camera and projector coordinates. The Hungarian method however is applicable only in scenarios where the cameras 14 and projectors 12 of adjacent PPPs 10 are rotated by less than 45 degrees with respect to each other. This is a reasonable assumption for rectangular planar display. However, for more general arrangements of projectors 12, the color coding of the clusters 32 can be used to provide more information to this method, so that larger relative angles between the cameras 14 can also be tolerated.

Turn to the step of Local Homography Calculation. The correspondences are used to calculate homographies, a linear relationship tying the different device coordinates. Let the projector 12 of a PPP 10 be denoted by P and the camera 14 by C. The homography between two devices 10, A and B, is denoted by H(A→B). Each PPP 10 calculates the self homography relating the PPPs 10 own projector 12 and camera 14, $H(C_{r,c} \to P_{r,c})$. It also computes the local homography to each neighbor, $H(P_{(r+k),(c+k)} \to P_{r,c})$ where k is selected from the set $\{-1,0,1\}$, as $H(P_{(r+k),(c+k)} \to C_{r,c}) \times H(C_{r,c} \to Pr,c)$.

The step of Local Photometric Blending uses local homographies. Each projector 12 finds the overlap with its neighbor and applies a linear or cosine blending (in the horizontal or vertical direction) to the RGB colors in this region.

The step of Distributed Geometry Alignment uses a distributed methodology for the conventional homography tree technique to achieve geometric alignment. This step starts with election of a PPP 10 close to the center of the display as the root of the homography tree. All other PPPs 10 align themselves with respect to the root. The homography tree is built in a breadth-first fashion in O(ln(mn)) steps using network based communication across adjacent PPPs 10. The process is initiated by the root. Each PPP 10 sends its homography-to-root to all its neighbors who augment this with their local homographies to generate their own homography-toroot. This augmentation-propagation continues until all nodes have computed their homography-to-root. Note that just as in centralized homography tree technique, errors can accumulate along the paths from the root creating larger errors at PPPs 10 which are further away from the root. In the illustrated embodiment, we experience a maximum error of 2-3 pixels. However due to limitations in human perception, this error is only visible in special patterns like grids or checkerboards.

Three of the five capabilities mentioned above have thus been disclosed. Now, we present advanced capabilities d-e to realize truly scalable reconfigurable displays. Consider the step of Adding and Removing Projectors. We provide methods to handle addition and removal of PPPs 10 to a calibrated display (in stable state). The PPP 10 cameras detect addition/removal of neighboring PPPs 10 automatically and broadcast the information to all the existing PPPs 10. Upon receiving this broadcast, all PPPs 10 switch to the calibration phase in order to reconfigure the display.

```
Algorithm Addition-Removal-Handling-for-Compute
begin
    1.  Recv Msg from non-empty Msg-Buf;
    2.  if (ADD-Msg) then
    3.      CALIB = TRUE;
    4.  elseif (DELETE-Msg)
    5.      (nr, nc) = row and column extracted from Msg;
    6.      if (r between nr and closest vertical boundary to nr) or (c
            between nc and closest horizontal boundary to nc) then
    7.          Deactivate myself;
    8.      else
    9.          Update (r,c,m,n) to reflect the new configuration;
    10.     endif
    11. endif
End
Algorithm Addition-Removal-Handling-for-Capture
begin
    1.  Process /to detect add or removal;
    2.  Broadcast MSG(Add/Removal, r, c);
    3.  CALIB = TRUE;
end
```

The step of Detecting Addition/Removal contemplates that each PPP 10 uses its local homographies to segment the image into regions corresponding to non-overlap areas, neighbor overlap areas, and empty areas (where no PPP 10 has projected). This segmentation can be done a priori during the alignment step of calibration. In the stable state, an addition is signaled by detection of non-black pixels in an empty region (using simple image processing techniques). Similarly, a removal is signaled by detection of a completely black neighbor region. When a PPP 10 detects an addition or removal, it broadcasts a recalibrate message to all other PPPs 10.

The step of Reshaping the Display in the case of addition performs a simple recalibration which achieves reshaping. However, since a removal creates a hole in the display, some PPPs 10 need to be deactivated to reshape the display. For this, the message broadcasted during removal contains the coordinates of the deleted PPP 10. Using this information, the PPPs 10 who are on the path to the nearest vertical and/or horizontal boundary from the removed PPP 10 deactivate themselves. The other PPPs 10 then recalibrate to reshape the display.

Turn now to the step of Handling Faults. We envision hundreds of PPPs 10 making a tiled display, especially in a public venue. In such scenarios it is a desirable to handle faults allowing the display to run at a lower capability even when the fault is being attended to. So, in this section, we handle the most common fault of bulb outage. If the fault occurs in the stable state, it is handled exactly like removal of a PPP 10. If the fault occurs after the Configuration Identification step of calibration, we devise the following mechanisms to advance all the PPPs 10 to the stable state where this is handled as a removal. Two cases occur as follows. If the faulty PPP 10 is not the root, all the PPPs 10 proceed to stable state automatically. If the faulty PPP 10 is the root, the alignment stalls. We handle this using the invariant that queue must be empty after completion of Identification (since no change in patterns happen). So, the faulty root is detected by the neighboring PPPs 10 by the existence of a non-empty queue. These PPPs 10 broadcast a message asking everyone to advance to stable state. On receiving this message, all PPPs 10 comply and move to the stable state. A fault during or before the configuration identification step can be detected from the IP-Address Table in the following manner. First, if the top-left PPP 10 initiating the forward propagation fails, a conflict results in the IP-Address-Table with more than one PPPs 10 having (r,c)=(1,1). 2. If any other PPP 10 fails, it is detected as a hole in the IP-Address-Table i.e a possible (r,c) pair is absent. Both the conflict and the hole can be resolved by deactivating some PPPs 10 as in removal of PPPs 10 in stable state. However, in this case, instead of recalibration, the other PPPs 10 will predict the removals and update their configuration parameters (r, c, m, n) and the IP-Address-Table appropriately to instrument the reshaping in the subsequent alignment step.

We simulate a distributed asynchronous system on a 3×3 array of 9 projectors. We augment each projector with a small video camera and a networked computer to simulate a PPP 10. For initial algorithm design and testing we decided to work with a simulation where we mimic the asynchronous environment by choosing the PPPs 10 at random and the part of the SPMD code to be executed on the chosen PPP 10 at a random granularity. This process repeats till all PPPs 10 complete the execution of their SPMD program. Our calibration takes less than a minute assuming all PPPs 10 have comparable speeds.

Figure 6A:
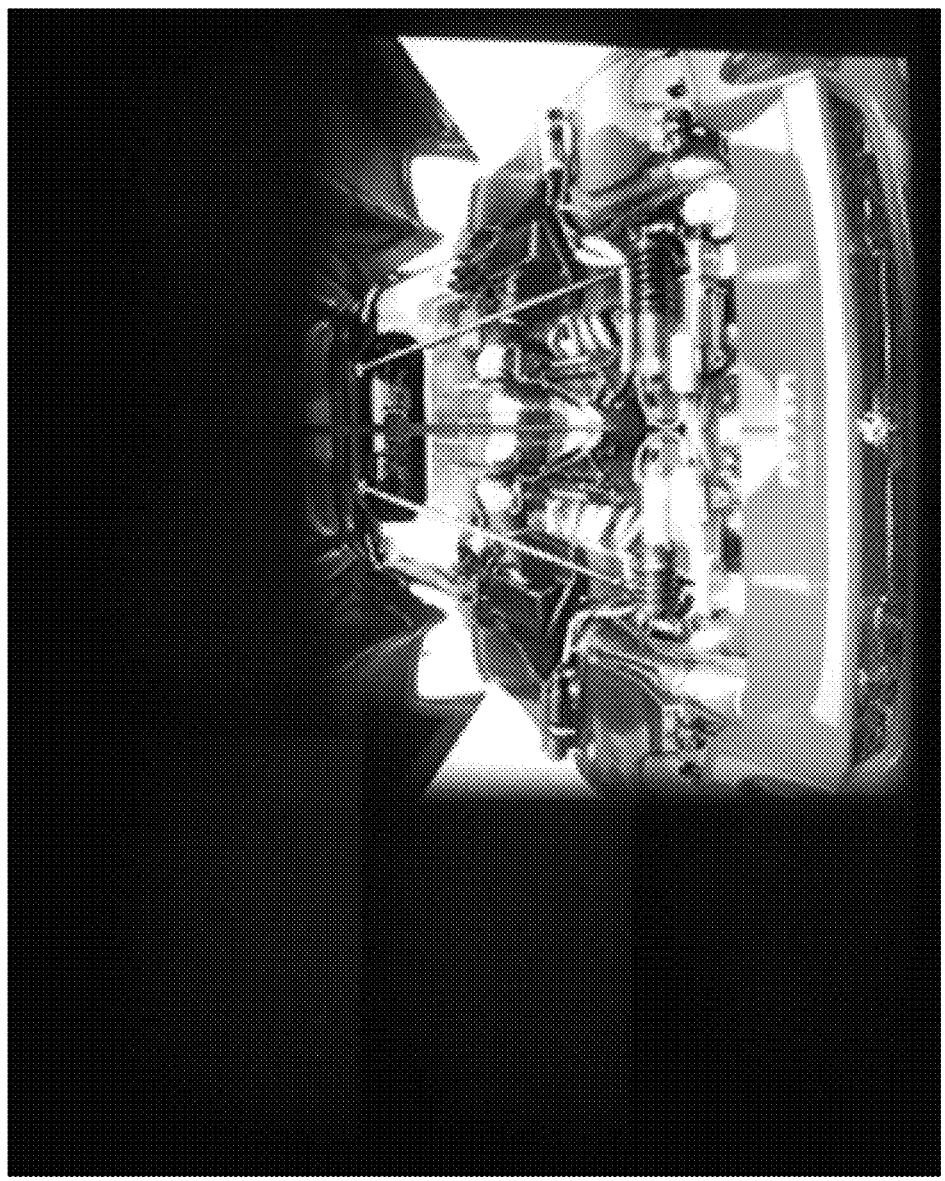
FIGS. 6a-6b are illustrations of the reshaping of a display to add a projector.
Figure 6B:
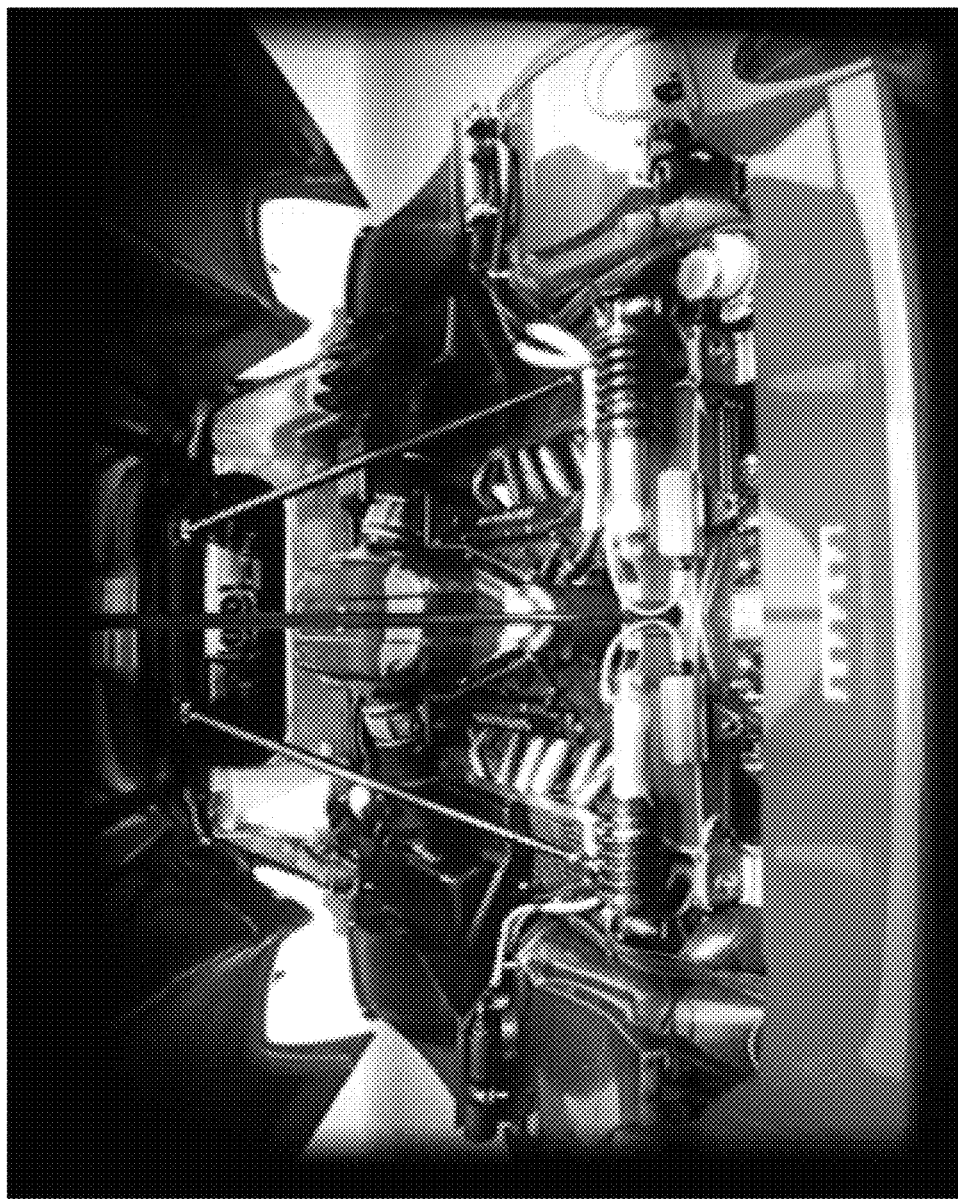
Figure 6C:
FIGS. 6c-6d are illustrations of the reshaping of a display to delete a projector.
Figure 6D:

FIGS. 6a-6d demonstrate addition/removal of projectors 12 in a video which shows live results of the entire system at work. In most of the video, we deliberately slow down the calibration process by a factor of six to eight to aid better understanding. Two projectors are added to a 2×2 PPP 10 display shown in FIG. 6a to make it a 2×3 PPP 10 display shown in FIG. 6b. When one projector 12 is removed from a 3×3 PPP 10 display as shown in FIG. 6c, the display reshapes itself by switching off the appropriate rows and columns to generate a 2×2 PPP 10 display as shown in FIG. 6d.

The current implementation of our method can be made more robust. For example, the current prototype is unable to detect slight movements in the PPPs 10 to trigger a recalibration. It can also be confused by spurious lighting in the display surroundings detecting it as addition of a PPP 10. Further, a black frame in one of the PPPs 10 can be detected as removal by the adjacent PPP 10. However, these can be easily improved by advanced image processing, simple network-based communications or inexpensive augmented hardware. For example, looking for the neighbor discovery patterns in the newly lighted display surroundings can easily differentiate the addition of a PPP 10 from spurious lightings. The removal detection can be made robust by communication and processing "I am alive" messages across PPPs 10. This is a common approach to detect faulty nodes in distributed systems. Similarly, slight movements in the PPPs 10 can be handled if each PPP 10 is augmented with an inexpensive motion sensor. Note that using more than one of different types of sensors while generating such a smart device has been common in previous works. Examples include a tilt sensor in the iLamps and more than one camera in conventional projector bricks. Augmentation of PPPs 10 by such devices does not reduce the effectiveness of the disclosed framework and prototype in any way. PPP 10 is the minimal intelligent display unit that can provide the hot plug-and-play feature.

There has been a plethora of work on automatic calibration of multiprojector displays in the last decade. Yet, such displays are still not commonplace, the biggest inhibition being the complexity of their setup. The disclosed asynchronous distributed calibration methodology has the potential to remove this final barrier and make multi-projector displays truly a commodity products. The illustrated embodiment is the first system devised for distributed calibration.

It is to be understood that the illustrated embodiment can be extended into a homography tree technique which calibrates every PPP 10 to a root PPP 10 and is prone to inaccuracies. Prior art centralized error diffusion methods which attempt to address this are not amenable for distributed methodologies. The illustrated embodiment can be augmented by local geometric calibration methodologies that can work without relying on a root PPP 10. Photometric nonuniformity within and across projectors 12 beyond blending the overlap region can be addressed by designing distributed versions advancing the more rigorous prior art photometric calibration methods. This advance would involve addressing the varying dynamic range and color gamut of the sensors. The scope of the invention includes the use embedded hardware that can efficiently implement our distributed asynchronous method in each PPP 10. The method of the illustrated embodiment can be extended to existing display infrastructures, which may not have a camera 14 for every projector 12, by addressing the more general problem of calibrating m projectors using and n cameras, where m is not equal to n, in a distributed fashion.

Distributed calibration can have a bigger impact than just for scalable displays. Ubiquitous pixels, pixels anywhere and everywhere, have been envisioned by contemporary researchers as a critical component of any future workspace. Other critical components of future workspaces like large scale data generation and processing, ubiquitous computing, high performance networking, rendering and resource management middleware has seen significant work supported by national initiatives like TeraGrid and OptIPuter. However, ubiquitous pixels are yet to be realized by today's display technology. The key challenges are to develop methodologies to handle nonplanar, non-Lambertian and nonwhite surfaces. The disclosed asynchronous distributed calibration via PPPs 10 is the first step in that direction, and has tremendous potential in realizing such ubiquitous pixels "flooding" our workspaces.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A distributed and calibrated apparatus for providing a composite display from a plurality of plug-and-play projectors comprising a plurality of self-sufficient modules, each module comprising:
   one plug-and-play projector of the plurality of plug-and-play projectors;
   a camera coupled to the projector; and
   computation and communication means for executing an algorithm that simultaneously runs on each self-sufficient module to generate a scalable and reconfigurable, registered and calibrated composite display without any need for user input,
   the computation and communication means being coupled to the projector.

2. The apparatus of claim 1 where each self-sufficient module comprises means for dynamically adding and/or removing a projector from the composite display.

3. The apparatus of claim 1 where each self-sufficient module comprises means for detecting faults.

4. The apparatus of claim 1 where each self-sufficient module comprises means for reshaping the composite display to a usable shape in response to addition or removal of a projector, and/or existence of a fault in projector performance.

5. The apparatus of claim 1 where each projector generates an image, where the composite display has a configuration characterized by a number of projectors used to generate the composite display from the images and a number rows and columns in an array of the images, and where each self-sufficient module comprises means for determining the configuration of the composite display.

6. The apparatus of claim 1 where each projector generates an image and where each self-sufficient module comprises means for determining a position in the composite display of the image.

7. The apparatus of claim 1 where each projector generates an image and where each self-sufficient module comprises means for geometrically and photometrically matching adjacent images in the composite display to provide a seamless composite display of the images.

8. The apparatus of claim 1 where each projector generates an image, without using a central server and where each module comprises means for managing its image within the composite display by itself so that the composite display is self-scalable and self-reconfigurable to a different aspect ratio or size without the need for user input.

9. The apparatus of claim 1 where each self-sufficient module comprises means for performing an action to run the composite display at a limited capability in case of failure of another one of the modules.

10. The apparatus of claim 1, wherein each self-sufficient module comprises means for discovering neighboring modules, finding a display configuration, and registering and calibrating itself geometrically and photometrically to each neighboring module.

11. The apparatus of claim 1, wherein the distributed and calibrated apparatus is an asynchronous apparatus.

12. The apparatus of claim 1, wherein the distributed and calibrated apparatus is a synchronous apparatus.

13. An apparatus for providing a display from a corresponding plurality of self-sufficient projector modules, each including a camera, and a communication and computational unit with a queue comprising:
   means for generating a plurality of tiled images in the display from the corresponding plurality of self-sufficient projector modules without the use of a central server; and
   means for capturing selected portions of the display corresponding to the plurality of self-sufficient projector modules using the corresponding camera included in each projector module to self-calibrate each corresponding tiled image in the display, to determine the corresponding position of each tiled image in the display, to determine the corresponding configuration of the tiled image of the display, and/or to determine a corresponding neighborhood of images for each self-sufficient projector without the use of a central server.

14. The apparatus of claim 13 further comprising means for dynamically adding or removing one or more projector modules from the plurality of projector modules to scale, reshape, and/or reconfigure the display.

15. The apparatus of claim 14 where in the case of a fault in one or more of the projector modules, further comprising means for automatically self-reconfiguring the display to a predetermined shape.

16. The apparatus of claim 13 where the means for capturing selected portions of the display comprises means for performing a Capture process in each self-sufficient projector module and where the means for generating a tiled image in the display comprises means for performing a Compute process in each self-sufficient projector module, and comprising means for providing a shared queue of images in each self-sufficient projector module and a shared Boolean program, CALIB, in each self-sufficient projector module used to denote the state of the corresponding self-sufficient projector module, where the means for performing the Capture process captures images from the corresponding camera and en-queues them in the corresponding queue, and where the means for performing the Compute process de-queues images from the corresponding queue, analyzes them, computes configuration and calibration parameters, and sends a corresponding image to be displayed by each self-sufficient projector module.

17. The apparatus of claim 16 where the means for performing the Compute process comprises in each self-sufficient projector module:
   means for finding the dimensions of the display, coordinates of the corresponding image in the array, and the IP addresses of all self-sufficient projector modules in the display in a Configuration Identification step using camera-based communication between adjacent self-sufficient projector modules;
   means for checking for adjacent neighboring images projected from corresponding self-sufficient projector modules using camera-based communication in a Neighbor Discovery step; and
   means for generating a seamless image by calibrating the display geometrically and photometrically in an Alignment step.

* * * * *